United States Patent [19]

Garrett et al.

[11] 4,284,929
[45] Aug. 18, 1981

[54] AMBULATOR CONTROL CIRCUITRY

[75] Inventors: Robert A. Garrett; John Silva; Craig R. Allen, all of San Diego, Calif.

[73] Assignee: The United States of America as represented by the Secretary of the Navy, Washington, D.C.

[21] Appl. No.: 955,427

[22] Filed: Oct. 27, 1978

[51] Int. Cl.³ ............................................ H02P 1/54
[52] U.S. Cl. ..................................... 318/51; 318/53; 318/59; 318/65; 318/67; 180/6.5
[58] Field of Search ................. 180/6.5, 170, 178, 179; 318/51, 53, 59, 65, 67, 34; 338/48, 68; 297/384, 333, 330, 353, DIG. 4, DIG. 10

[56] References Cited

U.S. PATENT DOCUMENTS

| | | | |
|---|---|---|---|
| 3,260,826 | 7/1966 | Johnson | 338/68 X |
| 3,351,148 | 11/1967 | Solomon | 180/6.5 |
| 3,731,756 | 5/1973 | Hajec | 180/6.5 |
| 3,812,929 | 5/1974 | Farque | 180/6.5 X |
| 3,814,199 | 6/1974 | Jones | 180/6.5 |
| 3,970,160 | 7/1976 | Nowick | 318/67 X |
| 4,054,319 | 10/1977 | Fogg, Jr. et al. | 297/353 X |
| 4,106,583 | 8/1978 | Nemeth | 180/6.5 X |
| 4,119,164 | 10/1978 | Fogg, Jr. et al. | 180/6.5 |

Primary Examiner—Ulysses Weldon
Attorney, Agent, or Firm—Richard S. Sciascia; Ervin F. Johnston; Harvey Fendelman

[57] ABSTRACT

Control circuitry for producing signals to control motors which propel a mobile platform for a standing paraplegic. Logic circuits connect a 3-axis joy stick controller to four permanent magnet DC motors mounted on the platform such that the platform follows in the direction of the displacement of the joy stick. The joy stick outputs are taken as inputs to several differential amplifiers. Each of a plurality of velocity servo amplifiers receives one input signal from the differential amplifier output and another from a tachometer feedback signal derived from each motor. Comparators receive the velocity servo amplifier outputs as well as a triangular wave input. Each comparator comprises a pulse width modulator which generates pulse outputs whose duty cycle is a function of the voltage inputs to each comparator. The comparator outputs then control motor rotation such that the platform moves in the direction of displacement of the joy stick.

20 Claims, 7 Drawing Figures

AMBULATOR CONTROL CIRCUITRY

BACKGROUND OF THE INVENTION

The present invention relates generally to the field of motor control circuitry and more specifically to controlling both the speed and direction of a number of DC motors. More particularly the general purpose of the ambulator control circuitry disclosed herein is to produce the signals necessary to control motors which propel a mobile platform for a standing paraplegic. The direction in which the platform moves can be controlled by manipulating a 3-axis joy stick controller.

At present there are no other known devices which raise a paraplegic into a standing position and allow him to move about on a minimum size platform that is under power. Motorized wheelchairs and similar devices have been disclosed for providing greater automobility for the invalid occupant whereby he can achieve independence from the need for a pushing assistant and increase his traveling range by both increasing the speed of travel and eliminating the muscle strain and fatigue of self-propulsion by means of the drive wheels of the chair. These systems are entirely inadequate for the paraplegic since they generally provide no mechanism for raising him to a standing position nor do they permit him mobility in the standing position. Moreover, it has been customary in the past to use transistors in their linear region to control the motors of the wheelchair or similar device. Operation of transistors in this mode is inherently less efficient than the pulse width modulated signal approach disclosed herein.

SUMMARY OF THE INVENTION

In accordance with the present invention a control system for controlling the speed and direction of a paraplegic platform or other mobile device is disclosed. The control circuitry disclosed herein utilizes special logic circuits which connect a 3-axis joy stick controller to four permanent magnet DC motors in the ambulator base to drive the motors in various clockwise and counter clockwise combinations to produce the desired motion of the platform. The result is that the platform always follows in the direction of the displacement of the joy stick.

OBJECTS OF THE INVENTION

It is a primary object of the present invention to disclose a 3-axis joy stick motor control circuit that is inherently more efficient than other control circuits utilizing transistors in their linear region.

It is a concomitant object of the present invention to disclose a motor control circuit particularly suitable for controlling the drive motors of a mobile platform.

It is a further object of the present invention to disclose control circuitry to control the drive motors of a mobile platform such that the platform always follows in the direction of the displacement of the joy stick provided as the variable control mechanism.

Other objects, advantages and novel features of the invention will become apparent from the following detailed description of the invention when considered in conjunction with the accompanying drawings.

DESCRIPTION OF THE PREFERRED EMBODIMENT

Figure 1:
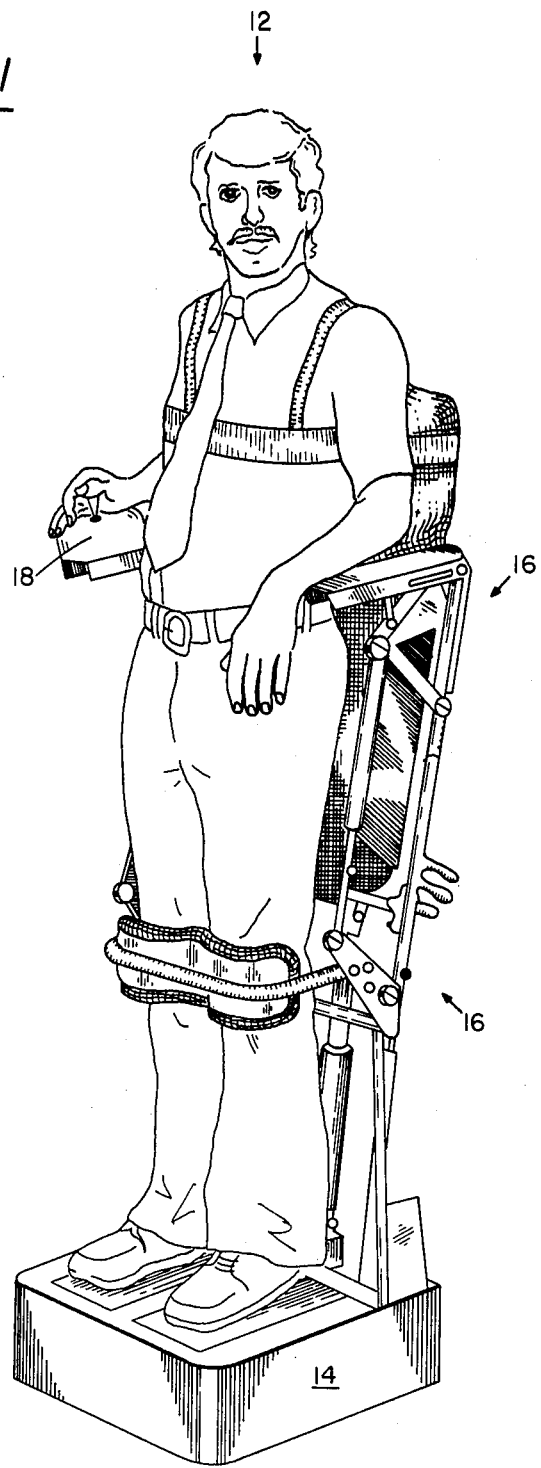
FIG. 1 is an isometric view of the ambulator base shown with its raising mechanism.

The ambulator with raising mechanism 12 is comprised generally of a platform 14 and a lifting mechanism 16. The details of the platform 14 and lifting mechanism 16 are described in co-pending U.S. Pat. applications Ser. Nos. 007,285 and 062,835, filed Jan. 29, 1979 and Aug. 1, 1979, respectively (further identified as Navy Cases 62,920 and 62,921), the entire text thereof incorporated herein by reference. Notwithstanding that the present invention will be described with respect to the particular ambulator with raising mechanism 12 illustrated in FIG. 1, it is to be understood that the drive motor control circuitry disclosed herein can be used with any platform that requires mobility under the control of a joy stick or similar mechanism. The platform 14 contains the drive motors, drive electronics, control electronics, and battery power supply. The joy stick 18 is mounted on the arm rest of the ambulator within easy reach of the operator.

Figure 3:
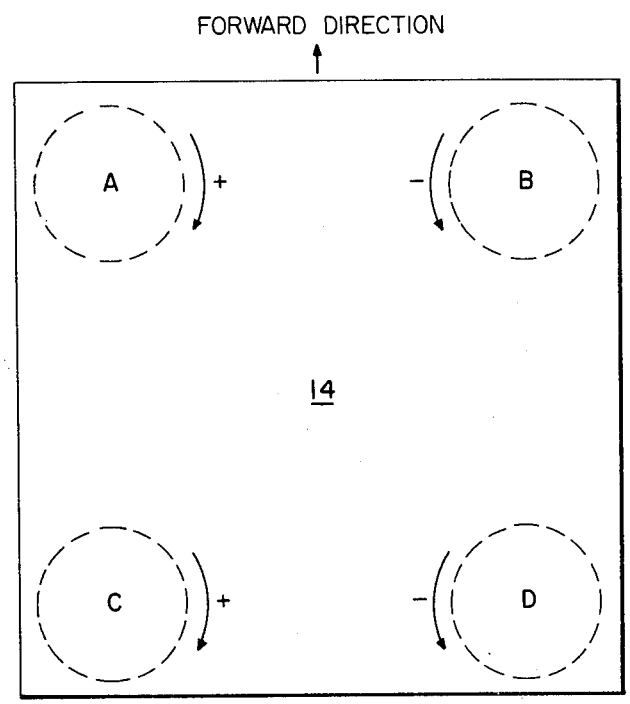
FIG. 3. is an overhead view of the ambulator base showing by way of illustration the motor and drive carriage assemblies.
Figure 2:
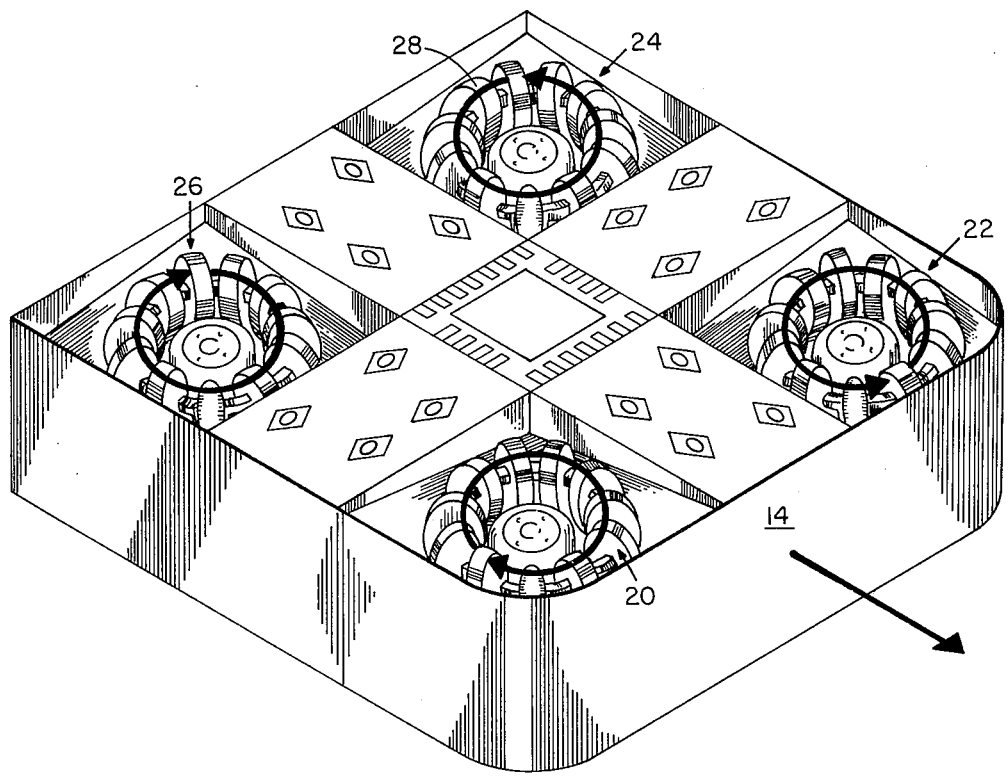
FIG. 2 is a perspective view of the four wheel carriages mounted on the underside of the ambulator platform used for propelling the platform.

The arrangement and operation of the drive motors and drive roller assemblies are more easily understood by referring to FIGS. 2 and 3. Referring to FIG. 2 it is seen that mounted on the underside of the platform 14 are four drive carriage assemblies 20, 22, 24 and 26. Each of the drive carriage assemblies contains eleven drive rollers 28 and is canted toward the center of the platform 14. Either one or two drive rollers 28 on each drive carriage assembly contacts the floor at any given time. The drive carriage assembly and rollers are illustrated and described in more detail in co-pending U.S. Patent application Ser. No. 007,285 (further identified as Navy Case 62,920) incorporated herein by reference. The combinations of clockwise and counterclockwise rotations of the motor drive assemblies determines the direction of motion of the platform. Referring to FIG. 3 there is shown for illustrative purposes a top view of the ambulator base. The drive carriage motors and the drive carriage assemblies are denoted A, B, C and D for simplicity of explanation. Forward motion of the platform, for example, is the result of clockwise rotation of motors A and C and counterclockwise rotation of motors B and D. This can be written as: +A, −B, +C, −D where a + sign indicates clockwise rotation and a − sign denotes counterclockwise rotation. Consequently, the other directions of motion are achieved by rotation of the motors as indicated in Table I below.

TABLE I

| Platform Direction | Motor Rotation |
| --- | --- |
| Reverse | −A, +B, −C, +D |
| Right | +A, +B, −C, −D |
| Left | −A, −B, +C, +D |
| Slew 45° | +A, −D |

TABLE I-continued

| Platform Direction | Motor Rotation |
| --- | --- |
| Slew 135° | +B, −C |
| Slew 225° | −A, +D |
| Slew 315° | −B, +C |
| Clockwise Rotation | −A, −B, −C, −D |
| Counterclockwise Rotation | +A, +B, +C, +D |

Figure 4:
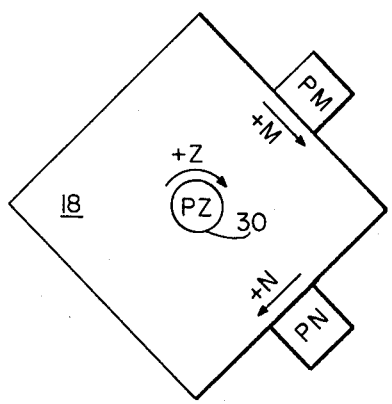
FIG. 4 is an illustration of the joy stick controller.
Figure 6:
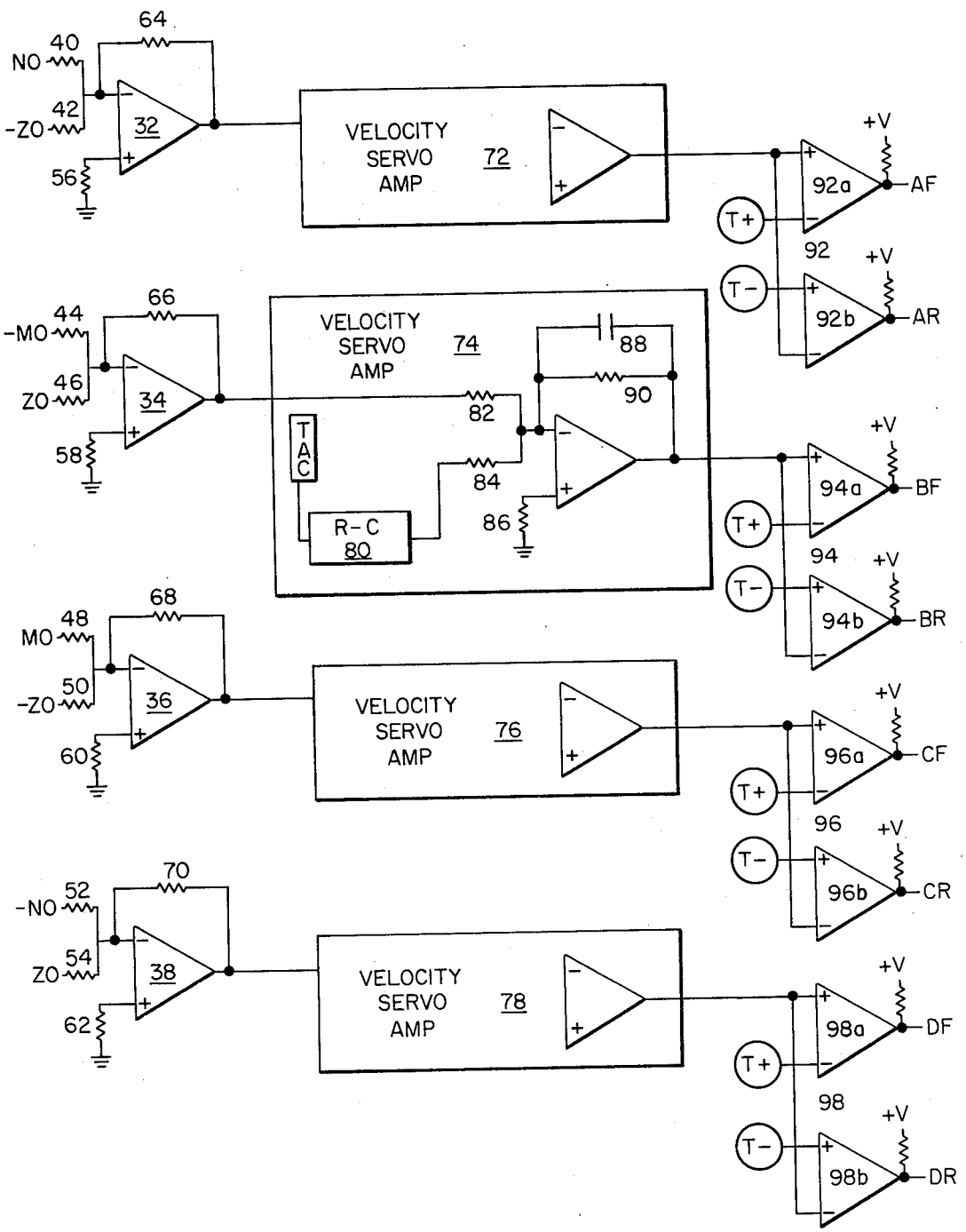
FIG. 6 is a schematic diagram of the control circuit of the present invention.

Referring to FIG. 4 there is illustrated a top view of the joy stick controller 18. The joy stick 18 has a shaft 30 that is movable from its rest position along three different axes. These axes are denoted M, N, and Z. The M and N directions of displacement of the joy stick are denoted as positive for displacements along the directions indicated by the arrows in FIG. 4. Rotation of the joy stick shaft 30 in a clockwise direction is denoted as a positive Z axis input. The joy stick potentiometers are represented by the notations PM, PN, and PZ and are illustrated in the schematic network diagram of FIG. 5 to be described below. To show how the directions of motion set forth in Table I above relate to the positioning of the joy stick 18, reference is made to Table II below.

TABLE II

| Platform Direction | Joy Stick Displacement | Motor Rotation |
| --- | --- | --- |
| Forward | −M, −N | → +A, −B, +C, −D |
| Reverse | +M, +N | → −A, +B, −C, +D |
| Right | +M, −N | → +A, +B, −C, −D |
| Left | −M, +N | → −A, −B, +C, +D |
| Clockwise Rotation | +Z | → −A, −B, −C, −D |
| Counterclockwise Rotation | −Z | → +A, +B, +C, +D |
| Slew 45° | −N | → +A, −D |
| Slew 135° | +M | → +B, −C |
| Slew 225° | +N | → −A, +D |
| Slew 315° | −M | → −B, +C |

It should thus be apparent that if the joy stick 18 is moved straight forward potentiometers PM and PN are both moved in a negative direction which causes motors A and C to rotate clockwise and motors B and D to rotate counterclockwise. Considering the conditions for all other directions of motion, it can be seen that for a given displacement of the joy stick the platform 14 will move in a direction corresponding to the direction of the displacement of the joy stick 18. Further inspection of the conditions of motion illustrated in Table II above shows that displacement of the joy stick 30 in the +M direction always gives rise to clockwise rotation of motor B and counterclockwise rotation of C. Similarly, displacement of the joy stick along the +N axis gives rise to counterclockwise rotation of motor A and clockwise rotation of motor D. Likewise, displacement in the −M and −N directions gives rise to counterclockwise rotation of motors B and D and clockwise rotation of motors C and A, respectively.

Figure 5:
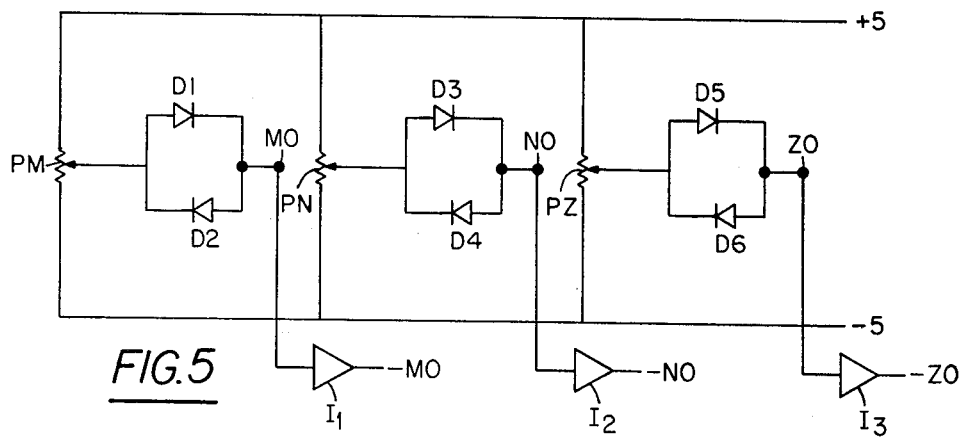
FIG. 5 is a schematic diagram of the joy stick potentiometer network.

Referring to FIG. 5 there is illustrated a schematic circuit diagram of the joy stick potentiometer circuit. Referring thereto it is seen that three potentiometers PM, PN and PZ are connected across a source of DC potential. The joy stick potentiometers are labeled with outputs of MO, NO, and ZO. The function of the diodes D1 through D6 is to create a dead band of approximately 0.5 volts. This makes adjustment of the joy stick easier and decreases the sensitivity for small displacements of the joy stick 18 near its center OFF position.

Each of the potentiometer outputs MO, NO and ZO is passed through an inverter amplifier (not shown) to thereby provide the negative of those outputs, i.e. −MO, −NO and −ZO. These six signals are then taken as inputs to the differential amplifiers 32, 34, 36 and 38 to generate the desired control outputs illustrated in Table II. The potentiometer output signals are connected to the differential amplifiers 32 through 38 through summing resistors 40, 42, 44, 46, 48, 50, 52 and 54 as illustrated. These resistors are connected to sum the PM or the PN potentiometer outputs with the output of the PZ potentiometer. The positive inputs of each of the differential amplifiers 32 through 38 are connected to 0 volt reference sources through impedance matching resistors 56, 58, 60 and 62. Gain increasing resistors 64, 66, 68 and 70 are connected as illustrated. Velocity servo amplifiers 72, 74, 76 and 78 are constant velocity feedback devices. One side of the inverting input for each velocity servo amplifier comes from a joy stick drive signal, i.e. from the output of its respective differential amplifier 32, 34, 36 or 38. The other side of the inverting input to each velocity servo amplifier comes from a tachometer signal from each drive motor. As is well known, the tachometer signal is an analog voltage which is a function of the RPM or the particular motor. The tachometer feedback signal is fed into a suitable R-C network such as R-C network 80 shown for illustration purposes only within velocity servo amplifier 74. The R-C networks for the remaining velocity servo amplifiers 72, 76 and 78 are identical and for simplicity are not shown. The output of each R-C network 80 is summed with the corresponding differential amplifier output across summing resistors 82 and 84 which again, for purposes of simplicity, are illustrated solely within velocity servo amplifier 74. The non-inverting input of each velocity servo amplifier is connected to ground through a suitable resistor 86 and gain control capacitor 88 and resistor 90 are also provided. Thus, as is readily apparent the velocity servo amplifiers 72 through 78 function as automatic velocity controls so that if the corresponding motor slows up under a load, the reduced RPMs is detected by the tachometer and the servo amplifier responds accordingly to speed the motor up as is well known.

The velocity servo amplifier outputs are fed into four pairs of comparators 92, 94, 96 and 98. Each of the comparators in a pair also has T+ and T− inputs. T+ represents a triangular wave input and T− represents the negative of that triangular wave. Each comparator pair comprises a pulse width modulator which generates pulse outputs whose duty cycle is the function of the voltage input to each comparator pair. The pulse output of comparator 92a is AF and the output of comparator 92b is AR. Output AF is connected as will be described below to drive motor A in the forward direction and output AR is connected to drive motor A in the reverse direction. Similarly, comparators 94a, 94b, 96a, 96b, 98a, and 98b have respective outputs BF, BR, CF, CR, DF and DR for driving the motors B, C and D in the forward and reverse directions, respectively. As an example of the operation of this logic circuit, as the voltage at the non-inverting input of comparator 92a and the inverting input of comparator 92b increases above zero volts in response to joy stick 30 displacement in the −M, −N direction, the output pulses at output AF increases in width. For this example the voltage at output AR will remain zero volts. As the voltage at the non-inverting input of comparator 92a and the inverting input of comparator 92b decreases below zero volts, in response to joy stick displacement in the +M, +N direction, the output pulses at output AR increases in width and the voltage at output AF remains at zero volts. The signals at the outputs AF and AR are then used to control motor rotation in the forward and reverse directions respectively over a duty cycle range of 0 to 100% with infinite variation inbetween. The result is a fully proportional pulse width modulator motor control system.

Figure 7:
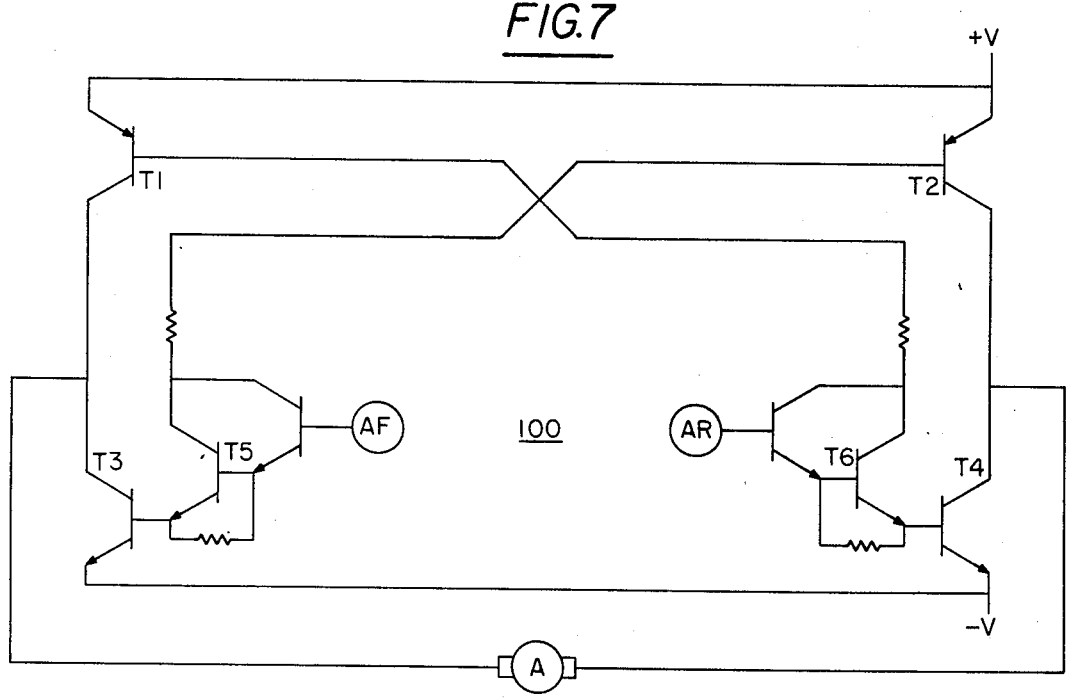
FIG. 7 is a schematic diagram of a typical drive channel for each motor.

A typical motor drive channel 100 is illustrated in FIG. 7. Transistors T1 through T4 form a bridge with the motor A across the bridge. Control signal AF through darlington transistor T5 pulse width modulate drive transistors T2 and T3 to control motor rotation in a clockwise direction. Control signal AR similarly modulates the other side of the bridge to control counterclockwise rotation.

To recapitulate, displacement of the joy stick in any given direction and/or rotation of the joy stick from its rest position results in a voltage output from the joy stick potentiometers that is commensurate with the degree and direction of displacement. The joy stick potentiometer voltage outputs are converted to logic signals by the differential amplifiers 32 through 38. The velocity servo amplifiers 72 through 78 provide for automatic velocity control of the drive motors. The outputs of the velocity servo amplifiers serve to pulse width modulate the triangular wave signals T+ and T− and the comparator pairs 92 through 98 ultimately provide the drive signals for the motor drive channels.

Obviously many modifications and variations of the present invention are possible in the light of the above teachings. It is therefore to be understood that within the scope of the appended claims the invention may be practiced otherwise than as specifically described.

What is claimed is:

1. A joy stick motor control device comprising:
   a plurality of electrical motor means for driving a plurality of loads;
   a plurality of pulse width modulated signal generators, each having its output connected to one of said plurality of electrical motor means;
   a plurality of velocity servo amplifiers, each having its output connected to one of said pulse width modulated signal generators;
   a plurality of differential amplifiers each having its output connected to one of said velocity servo amplifiers;
   first, second and third joy stick potentiometers operably connected to said plurality of differential amplifiers; and
   a three axis joy stick operably coupled to said first, second and third joy stick potentiometers;
   wherein said plurality of electric motor means comprises first, second, third and fourth DC motors.

2. The device of claim 1 wherein said plurality of motor means comprises first, second, third and fourth bipolar motor drive channels.

3. The device of claim 1 wherein each said pulse width modulated signal generator comprises a first and second comparator for generating bipolar pulse outputs.

4. The device of claim 3 wherein each said comparator has a triangular wave input.

5. The device of claim 1 wherein each of said plurality of electric motor means comprises an electric motor operable in both forward and reverse directions.

6. The device of claim 5 further comprising:
   each of said first, second and third joy stick potentiometers having an output
   first second and third means connected, respectively, to said first, second, and third potentiometer outputs for providing first, second, and third inverted outputs; and
   each of said plurality of differential amplifiers having its input connected to one of said potentiometer outputs and to one said potentiometer inverted outputs.

7. The device of claim 6 wherein said plurality of differential amplifiers comprises first, second, third and fourth differential amplifiers.

8. The device of claim 7 wherein:
   said plurality of motor means further comprises first, second, third and fourth bipolar motor drive channels, each being connected to one of said plurality of electric motors.

9. The device of claim 8 wherein:
   each of said plurality of pulse width modulated signal generators comprises first and second comparator means for generating bipolar pulse outputs.

10. An electro-mechanical joy stick motor control device comprising:
    a three axis joy stick;
    means connected to said joy stick for outputting first, second, and third voltages corresponding to the displacement of said joy stick from a rest position;
    means responsive to said first, second and third voltages for generating first, second, third and fourth pulse width modulating signals; and
    first, second, third and fourth comparators connected to said responsive means for outputting pulse width modulated signals.

11. The device of claim 10 wherein said outputting means comprises:
    first, second and third joy stick potentiometers.

12. The device of claim 10 wherein said responsive means comprises:
    first, second, third and fourth differential amplifiers connected respectively to first, second, third and fourth velocity servo amplifiers.

13. The device of claim 12 wherein each of said differential amplifiers has an input that is the sum of two of said first, second and third voltages.

14. The device of claim 10 wherein said first, second, third and fourth comparators each comprises a comparator pair.

15. The device of claim 14 wherein each said comparator pair has a positive and a negative triangular wave input.

16. The device of claim 10 further including first, second, third and fourth motor drive circuits connected, respectively, to said first, second, third and fourth comparators.

17. The device of claim 16 further including first, second, third and fourth DC motors connected, respectively, to said first, second, third and fourth motor drive circuits.

18. A joy stick motor control system for propelling a mobile platform comprising:
    a three axis joy stick;
    first, second and third joy stick potentiometers each being operably coupled to said three axis joy stick and each having an output;
    first, second and third means connected to said first, second and third joy stick potentiometers, respectively, for providing first, second and third inverted potentiometer outputs;

first, second, third and fourth means, each being connected to one of said potentiometer outputs and to one of said inverted potentiometer outputs, and each for developing bipolar output signals, and first, second, third and fourth electric motors each being operable in forward and reverse directions and each being connected to one of said first, second, third and fourth means for developing bipolar output signals.

19. The system of claim 18 wherein: each of said first, second, third and fourth means comprises means for developing pulse width modulated bipolar output signals.

20. The system of claim 19 wherein said first, second, third and fourth means further comprises:

first, second, third and fourth pulse width modulated signal generators, each outputting bipolar pulse outputs; and first, second, third and fourth bipolar motor drive channels, each being connected to one of said first, second, third and fourth pulse width modulated signal generators.

* * * * *